(12) United States Patent
Andersson

(10) Patent No.: US 11,220,299 B2
(45) Date of Patent: Jan. 11, 2022

(54) MODULAR LOADING PLATFORM FOR A VEHICLE

(71) Applicant: AXEL JOHNSON INTERNATIONAL AB, Stockholm (SE)

(72) Inventor: Ragnvald Andersson, Grästorp (SE)

(73) Assignee: AXEL JOHNSON INTERNATIONAL AB, Stockholm (SE)

( * ) Notice: Subject to any disclaimer, the term of this patent is extended or adjusted under 35 U.S.C. 154(b) by 0 days.

(21) Appl. No.: 16/964,355

(22) PCT Filed: Feb. 7, 2019

(86) PCT No.: PCT/EP2019/053026
§ 371 (c)(1),
(2) Date: Jul. 23, 2020

(87) PCT Pub. No.: WO2019/154921
PCT Pub. Date: Aug. 15, 2019

(65) Prior Publication Data
US 2021/0031840 A1 Feb. 4, 2021

(30) Foreign Application Priority Data
Feb. 9, 2018 (EP) .................................. 18156062

(51) Int. Cl.
*B62D 25/20* (2006.01)
*B62D 25/06* (2006.01)
(Continued)

(52) U.S. Cl.
CPC ......... *B62D 25/2054* (2013.01); *B62D 25/06* (2013.01); *B62D 25/2036* (2013.01); *B62D 65/02* (2013.01)

(58) Field of Classification Search
CPC .... B62D 25/02; B62D 25/20; B62D 25/2009; B62D 25/2054; B62D 25/2036;
(Continued)

(56) References Cited

U.S. PATENT DOCUMENTS 4,167,273 A * 9/1979 Hrasche ................ B62D 33/03
410/104
2003/0094827 A1* 5/2003 Faludy ...................... B60P 3/36
296/26.06

FOREIGN PATENT DOCUMENTS

| DE | 200 21 088 | 5/2002 |
|---|---|---|
| EP | 1 092 613 | 4/2001 |
| EP | 2 681 101 | 8/2016 |

OTHER PUBLICATIONS

International Search Report and Written Opinion from International Application No. PCT/EP2019/053026, dated May 16, 2019.

* cited by examiner

*Primary Examiner* — Dennis H Pedder
*Assistant Examiner* — Joyce Eileen Hill
(74) *Attorney, Agent, or Firm* — Westman, Champlin & Koehler, P. A.

(57) ABSTRACT

A modular loading platform for a vehicle, comprising a frame composed of a plurality of interconnected extruded frame members, wherein the members are each provided with at least two parallel grooves extending along the members and facing away from the frame. The platform further includes a set of mounting elements having parallel protrusions which have been inserted into engagement with said parallel grooves in one of the members. The mounting elements form a structure on which additional parts of the loading platform may be mounted.

18 Claims, 18 Drawing Sheets

(51) Int. Cl.
*B62D 25/02* (2006.01)
*B62D 65/02* (2006.01)

(58) Field of Classification Search
CPC ...... B62D 65/02; B62D 27/06; B62D 27/023;
B62D 33/02; B62D 33/03; B62D 33/023;
B62D 33/027; B62D 33/033; B62D
29/008; B60P 1/435; B60Y 2200/145
USPC ......... 296/10, 29, 30, 36, 50, 52, 57.1, 57.4,
296/100.06, 183.01, 184.1, 186.1, 193.04,
296/193.07
See application file for complete search history.

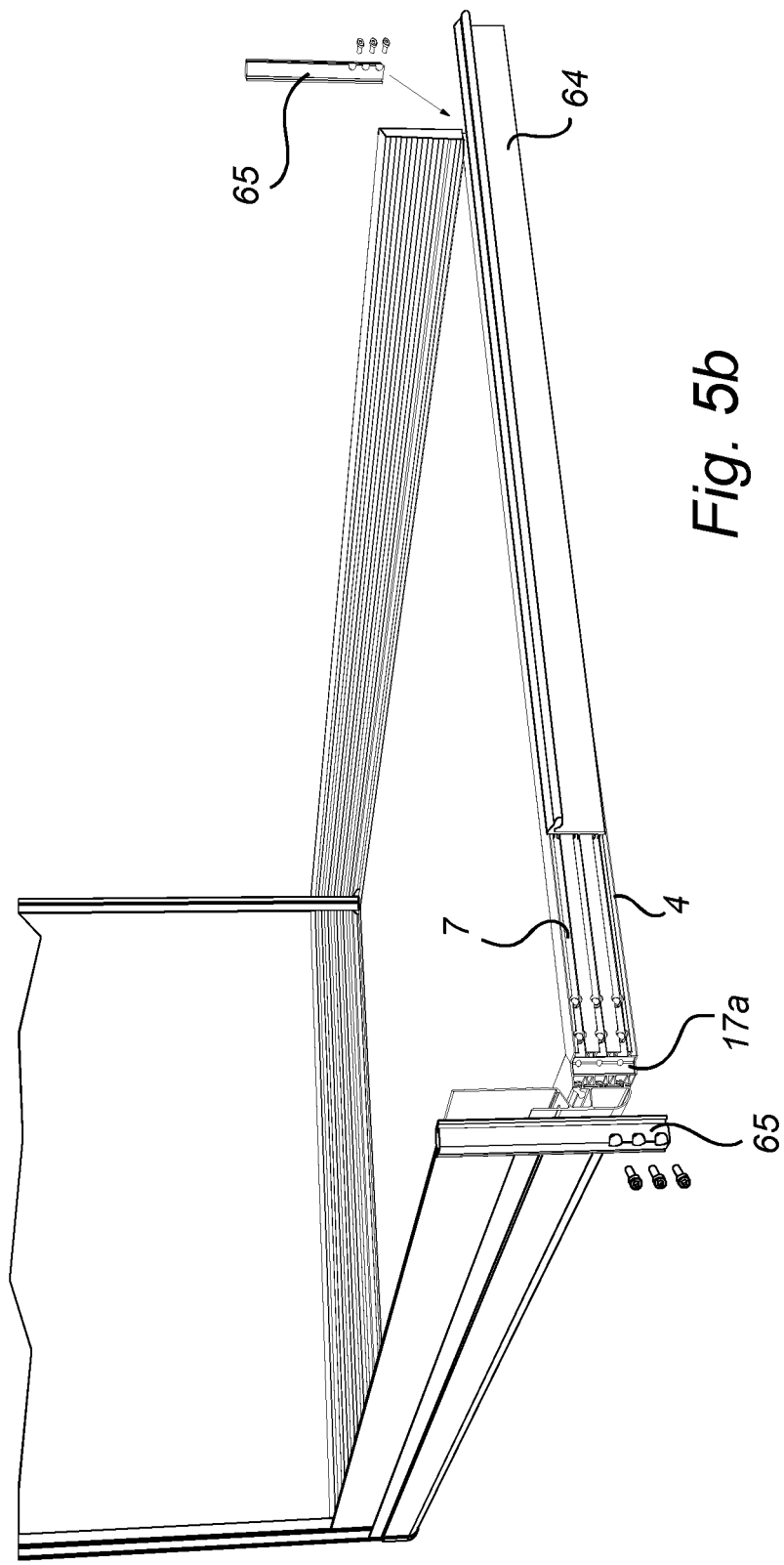

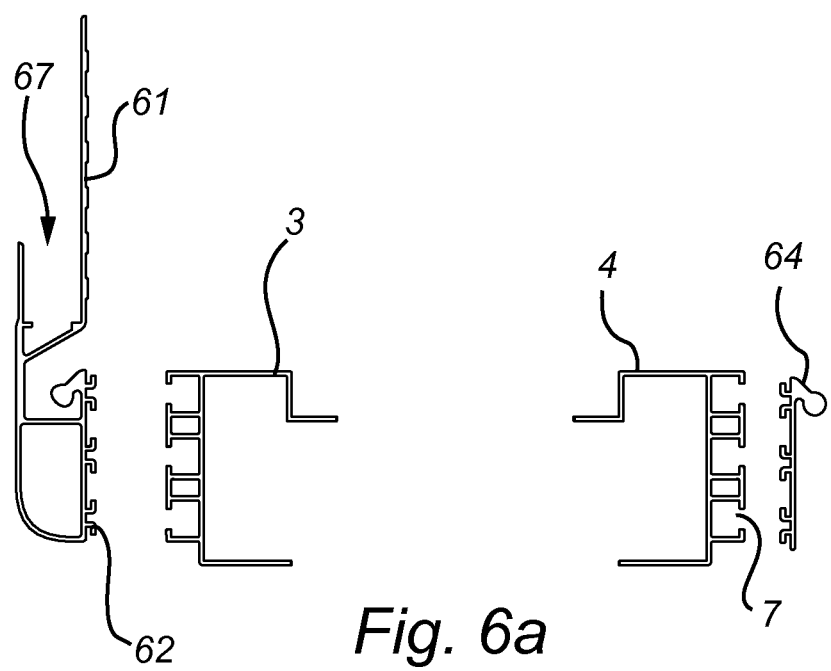
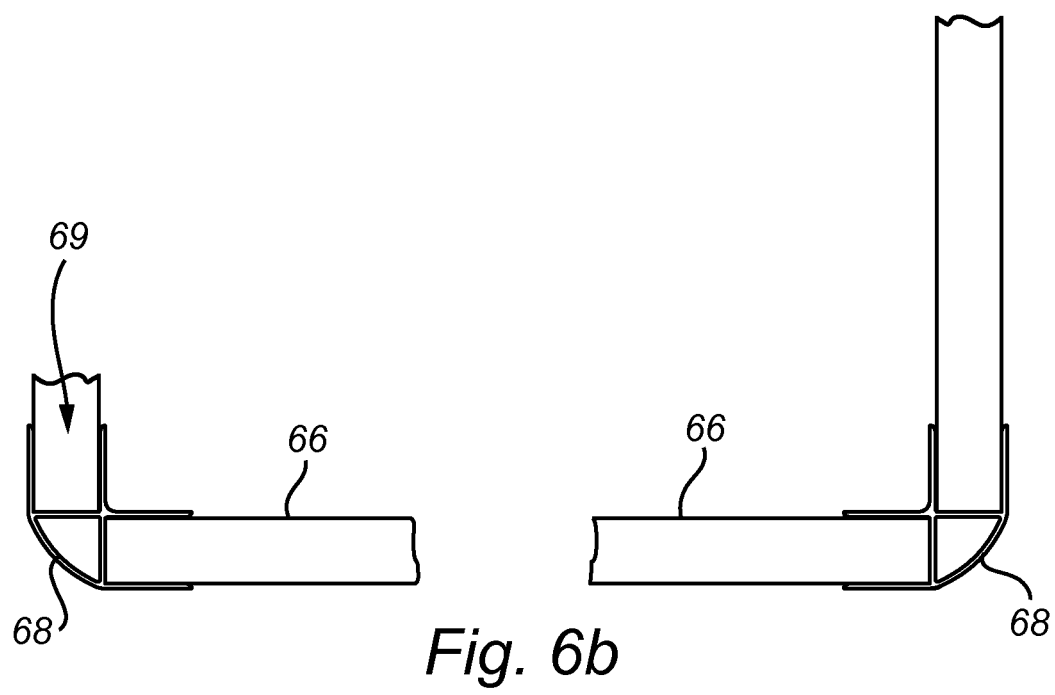

MODULAR LOADING PLATFORM FOR A VEHICLE

CROSS-REFERENCE TO RELATED APPLICATION

This Application is a Section 371 National Stage Application of International Application No. PCT/EP2019/053026, filed Feb. 7, 2019 and published as WO 2019/154921 on Aug. 15, 2019, in English, which claims priority to European Application No. 18156062.4, dated Feb. 9, 2018, the contents of which are hereby incorporated by reference in their entirety.

FIELD OF THE INVENTION

The present invention relates to a modular loading platform for a vehicle.

BACKGROUND OF THE INVENTION

Some transport vehicles, such small and medium sized trucks and lorries, are equipped with loading platforms, i.e. a flat surface on which goods can be placed. The loading platform may be equipped with a variety of different body structures depending on the use of the vehicle.

In some cases, the loading platform is provided with movable sides, so called dropsides. Such dropsides are typically rotatable around one of their longitudinal sides, and releasably connectable to posts or pillars fixed to the platform. One example of a system comprising such pillars and dropsides is the Armaton® system from Forankra AB in Sweden.

In other cases, the loading platform is provided with a body forming a closed loading compartment. There are also numerous other examples of different structures which are mounted to the loading platform of a truck.

Different structures and bodies have different mounting requirements, and some customization of the loading platform, in particular the sides thereof, is often required. In some cases, the entire platform has to be made-to-measure for a specific type of body structure, and therefore becomes relatively expensive.

Based on this, it would be desirable to have a more versatile loading platform, which can be easily adapted depending on the specific type of body structure.

GENERAL DISCLOSURE OF THE INVENTION

It is an object of the present invention to provide a versatile loading platform for a transport vehicle, which is adaptable for mounting of various additional parts of a body structure.

According to a first aspect, this and other objects are achieved by a modular loading platform for a vehicle, the platform comprising a substantially rectangular frame composed of a plurality of interconnected extruded frame members, the frame members including two side members, and a front member and a rear member connected transversally between the ends of the side members, wherein the rear member and the side members are each provided with at least two parallel grooves extending along the members and facing away from the frame, a set of mounting elements, each mounting element having parallel protrusions which have been inserted by sliding motion into engagement with the parallel grooves in one of the rear member and the side members, the mounting elements forming a structure on which additional parts of the loading platform may be mounted. A first one of the parallel protrusions engages a first parallel groove and a second one of the parallel protrusions engages a second parallel groove.

The parallel grooves allow for easy and reliable attachment of the mounting elements which have corresponding protrusions which engage the grooves. The mounting elements may be slidable along the grooves while being rotationally fixed. If require, some or all of the mounting elements may be secured by suitable fastening means, such as screws. The present invention thus offers a general purpose loading platform which may be easily adapted in a cost efficient manner.

When attached, the mounting elements provide a structure for mounting additional parts, such as platform dropsides, tailgate, walls, etc. The mounting elements thus provide a flexible adaptation of the frame for various uses. The same frame can thus be used in a variety of applications.

The extruded frame members, also referred to as "profiles", are preferably made of a light weight metal or metal alloy, such as aluminum. Aluminum profiles with desired cross-section are relatively easy to manufacture at low cost, and are available from commercial suppliers.

Also the mounting elements, with their parallel protrusions, are preferably extruded profiles, and also preferably made of a light weight metal or metal alloy, such as aluminum.

The platform may further comprise corner fittings attached to corners of the frame, the corner fittings configured to abut the mounting elements and prevent sliding motion thereof. Preferably, mounting elements are arranged to completely fill the distance between two corner fittings, such that all mounting element are held securely in place by the corner fittings.

The members may have an open, rectangular cross-section, with the opening facing into the frame. The parallel grooves are then formed on the outside of the web of the profile, i.e. in an opposite direction with respect to the opening.

Optionally, also the front member is provided with two or more parallel grooves extending along the element and facing away from the frame, and at least one mounting element with parallel protrusions has been inserted into engagement with the parallel grooves in the front member.

In one embodiment, the mounting elements include hinge elements, and the additional parts include platform dropsides hingedly attached to the hinge elements, so as to be rotatable around an axis parallel to a side of the frame. Such dropsides are typically rotatable between a closed position, in which they extend substantially vertically from the loading platform as sidewalls, and an open position, in which they hang down from the sides of the loading platform. A dropside arranged along the rear transversal element of the frame is often referred to as a tailgate.

In this embodiment, the mounting elements may further include side pillar fittings, and the additional parts may include side pillars attached to the pillar fittings in a plane normal to a plane of the frame. The dropsides may then be releasably connectable to these side pillars.

Each hinge element may be an elongated extruded member (profile) with an open cross section having a length corresponding to a length of one of the platform dropsides, and the longitudinal side of the platform dropside may then have an open cross section adapted to be engaged by the hinge element along its entire length. Such attachment of the dropsides provides an advantageous distribution of forces, making the dropsides reliable.

Each side of the frame may be provided with two (or more) such hinge elements and a side pillar fitting arranged between adjacent hinge elements. In this way, several dropsides may be used to surround a larger loading platform.

The dropsides and pillars may be of a type known per se, e.g. a dropside system under the trademark Armaton®. Mounting such dropside systems have conventionally required a customized loading platform adapted for attachment of the pillars and dropsides. By means of the present invention, adaptation of a generic loading platform is made significantly easier and more cost efficient.

In another embodiment, the mounting elements include wall mounting elements, and the additional parts include at least one wall panel fixedly fitted in the wall mounting elements. With such mounting elements, the loading platform may then be provided with rigid walls. The loading platform may further be provided with a top cover (roof) and a tailgate or back door, thereby forming a closed cargo compartment.

According to a second aspect, this and other objects are achieved by a method for assembling a modular loading platform for a vehicle including the steps of:

providing a set of extruded members including two side members, a front member and a rear member, wherein the rear member and the side members are each provided with at least two parallel grooves extending along the members;

mounting the front member and the rear member transversally between ends of the side members to form a substantially rectangular frame, with the grooves facing out from the frame;

providing a set of mounting elements, each mounting element having parallel protrusions configured to be inserted into engagement with the parallel grooves; and ding each mounting element into engagement with the parallel grooves in one of the rear member and the side members, the mounting elements forming a structure on which additional parts of the loading platform may be mounted.

BRIEF DESCRIPTION OF THE DRAWINGS

The present invention will be described in more detail with reference to the appended drawings, showing currently preferred embodiments of the invention.

FIG. 5a-e shows mounting of walls and roof to the loading platform.

FIG. 6a-b shows an exploded view of cross-sections of various profiles in FIG. 5c.

DETAILED DESCRIPTION OF PREFERRED EMBODIMENTS

Figure 1A:
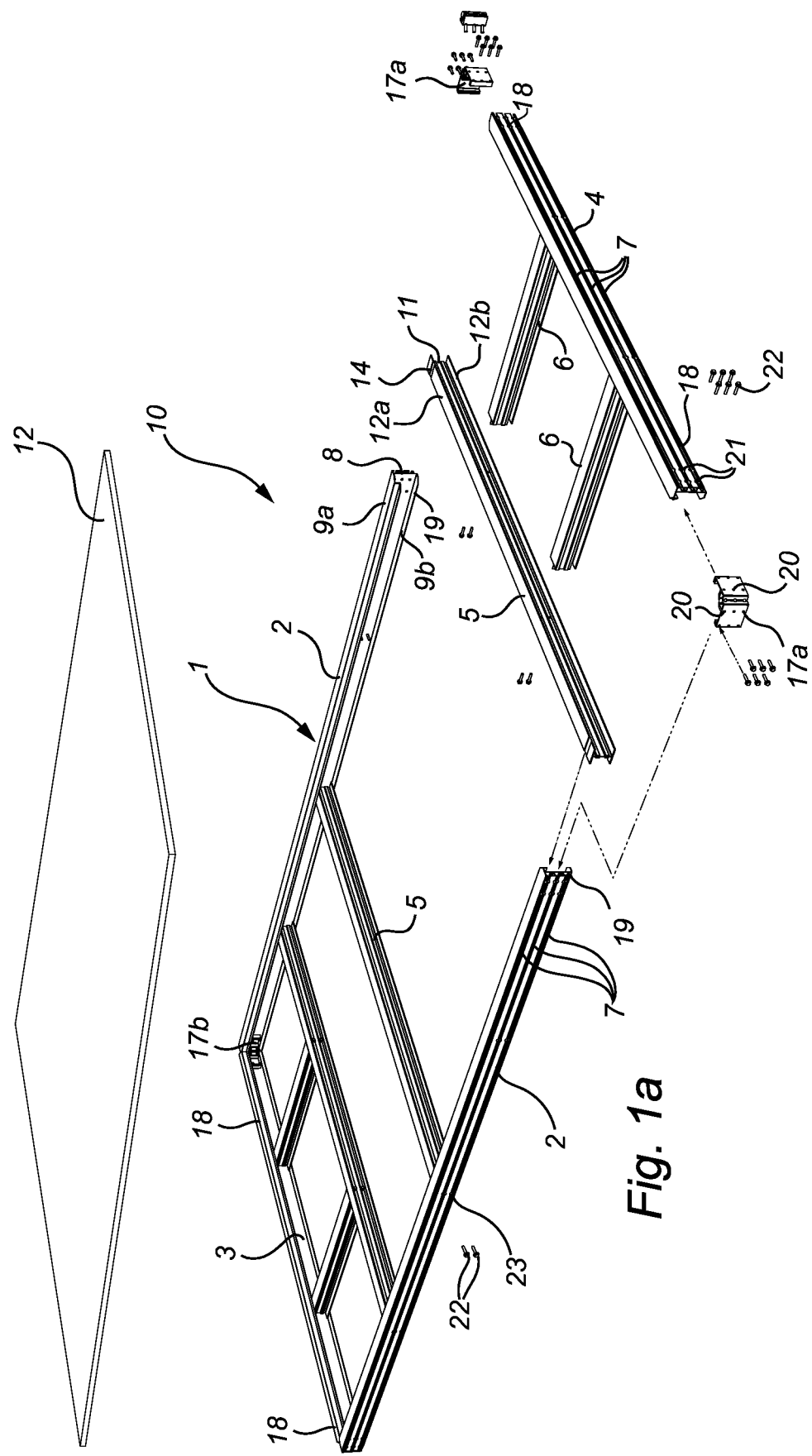
FIG. 1a shows a partly exploded view of a loading platform according to an embodiment of the invention.
Figure 1B:
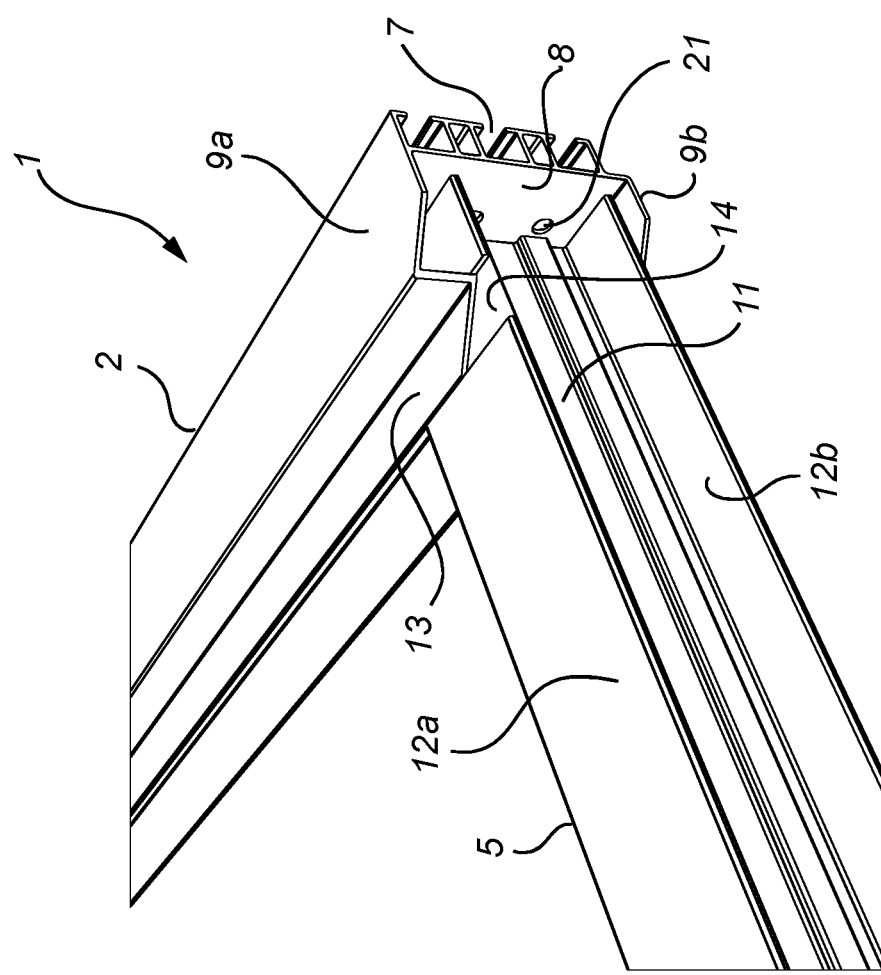
FIG. 1b shows a detail of the loading platform frame.
Figure 1C:
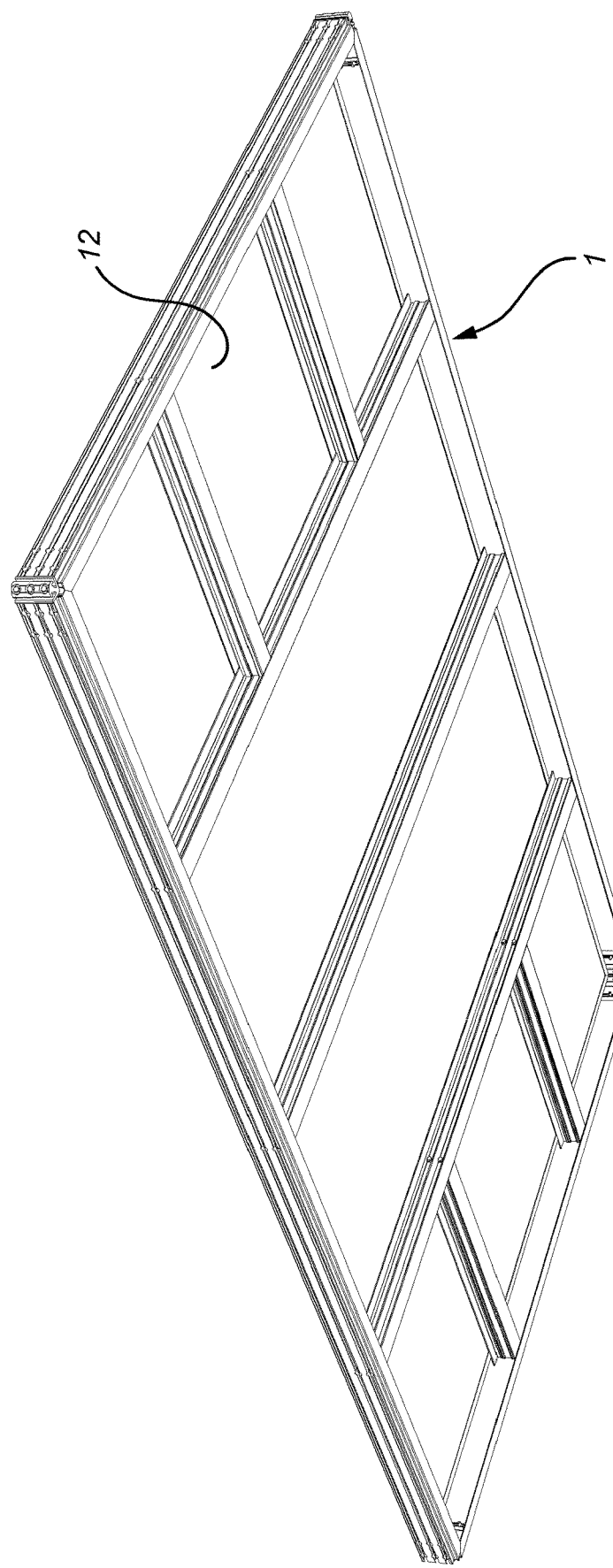
FIG. 1c shows the assembled loading platform from underneath.

The loading platform 10 in FIG. 1a-c has a frame 1 composed of a set of extruded members 2, 3, 4, so called profiles, of a strong but lightweight material, such as aluminum. The profile members include longitudinal side members 2 forming the sides of the platform, and a front member 3 and a rear member 4 connected transversally between the ends of the side members 2 to form an essentially rectangular outer frame. It is noted that the members 2, 3, 4, are not necessarily straight, in which case the frame is not quite rectangular. The frame 1 here further comprises additional support profile members 5, 6, including transversal support members 5 extending across the frame 1 and connected to the side members 2, and shorter, intermediate support members 6 extending between the outermost transversal support members 5 and the front and rear members 3, 4, respectively. These support members provide increased stability of the frame and thus the loading platform.

The rear member 4 and side members 2, and optionally also the front member 3, are formed with at least two, here three, parallel grooves 7 facing outwards from the frame 1.

For practical reasons, the rear, front and side members 2, 3, 4 may have identical cross-sections, and in the illustrated example they have an open rectangular cross-section (see FIG. 1b and FIG. 4), with a web 8 facing the outside of the frame and upper and lower flanges 9a, 9b. The groves 7 are formed on the outside of the web 8. The support members 5, 6 here have an I-profile (see FIG. 1b and FIG. 4), i.e. a central web 11 connecting upper and lower flanges 12a, 12b.

The platform 10 also includes a loading surface 12, e.g. a board of aluminum, wood, plywood or suitable laminate, arranged to rest on the frame 1. FIG. 1c shows the fully assembled loading platform from underneath.

Figure 2:
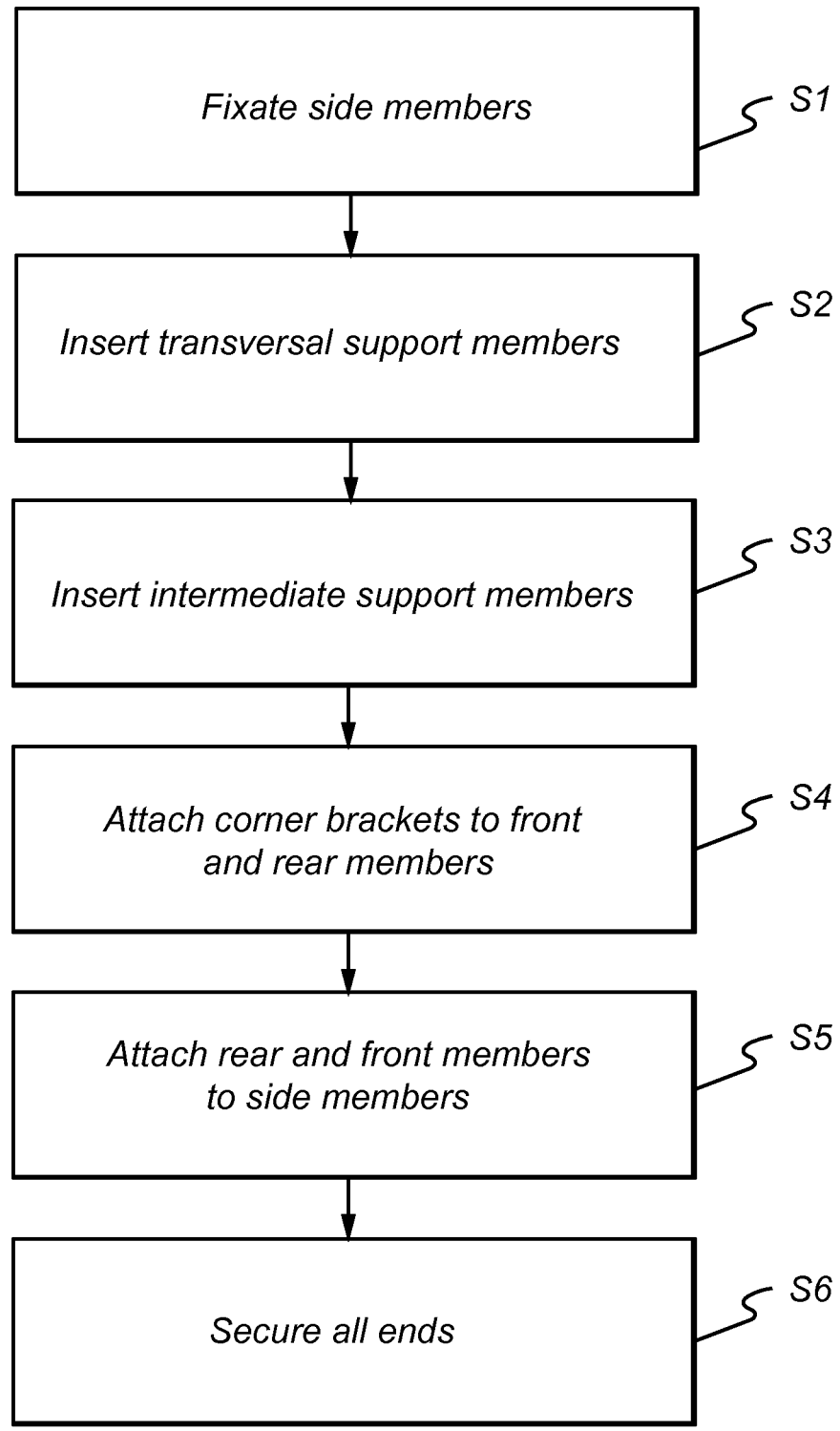
FIG. 2 shows a flowchart of a method for assembling the loading platform in FIG. 1.

With continued reference to FIGS. 1a-c, but also to FIG. 2, the assembly of the loading platform 10 will now be described.

First, in step S1, the side members 2 are arranged parallel to each other at a desired distance. Most preferably, the side members are fixedly arranged in some sort of fixture (not shown).

Then, in step S2, the transversal support members 5 are inserted between the side members 2. As illustrated in more detail in FIG. 1b, the support members 5 are here formed with a cut-out or recess 14 in their upper surface, i.e. here the upper flange 12a of the I-profile, and the cross-section of the side members 2 is configured such that a part 13 of the upper flange 9a engages the cut-out or recess 14. The engagement with recess 14 serves at least two purposes. Firstly, the upper surface of the upper flange 12a combines with the upper surface of the part 13 to form a smooth upper surface which may support the loading surface 12. Secondly, forces and stress may be shared between side members 2 and support members 5.

In step S3, two or more intermediate support members 6 are inserted into each of the rear and front members 3, 4 as shown in FIG. 1b. Also the intermediate support members 6 can be provided with cut-outs (not shown) to allow engagement by the rear and front members 3, 4, respectively, in a similar way as was shown in FIG. 1b. In step S4, corner brackets 17a, 17b are secured to the ends 18 of the front and rear members 3, 4.

In step S5, the rear and front members 3, 4, with their associated intermediate support members 6, are placed in their respective positions, and the corner brackets 17a, 17b are secured to the ends 19 of the side members. In the illustrated case, the corner brackets 17a, 17b are provided with holes 20 adapted to receive Taptite® screws 22, allowing easy fastening to the rear, front and side members 2, 3, 4. Through-holes 21 for the screws may have been provided in appropriate places before assembly, or be made when fastening the screws.

Finally, in step S6, the ends of all supporting members are secured with suitable fasteners. In the illustrated example, the cross section of the support members 5 and 6 (see FIG. 4) are adapted to receive Taptite® screws 22, which then may be used also to secure the supporting members. Again, through-holes 23 for the screws 22 (in the rear, front and side members 2, 3, 4) may have been provided in appropriate places before assembly, or be made when fastening the screws.

As will be described in detail in the following, the parallel grooves of the frame are used to secure mounting elements having parallel protrusions, which can be inserted by sliding motion into the grooves, each protrusion in a separate groove. These mounting elements may also be extruded, and may also be made of aluminum.

In one embodiment, illustrated in FIG. 3a-g and FIG. 4, the loading platform in FIG. 1a-c may be provided with dropsides.

Figure 3A:
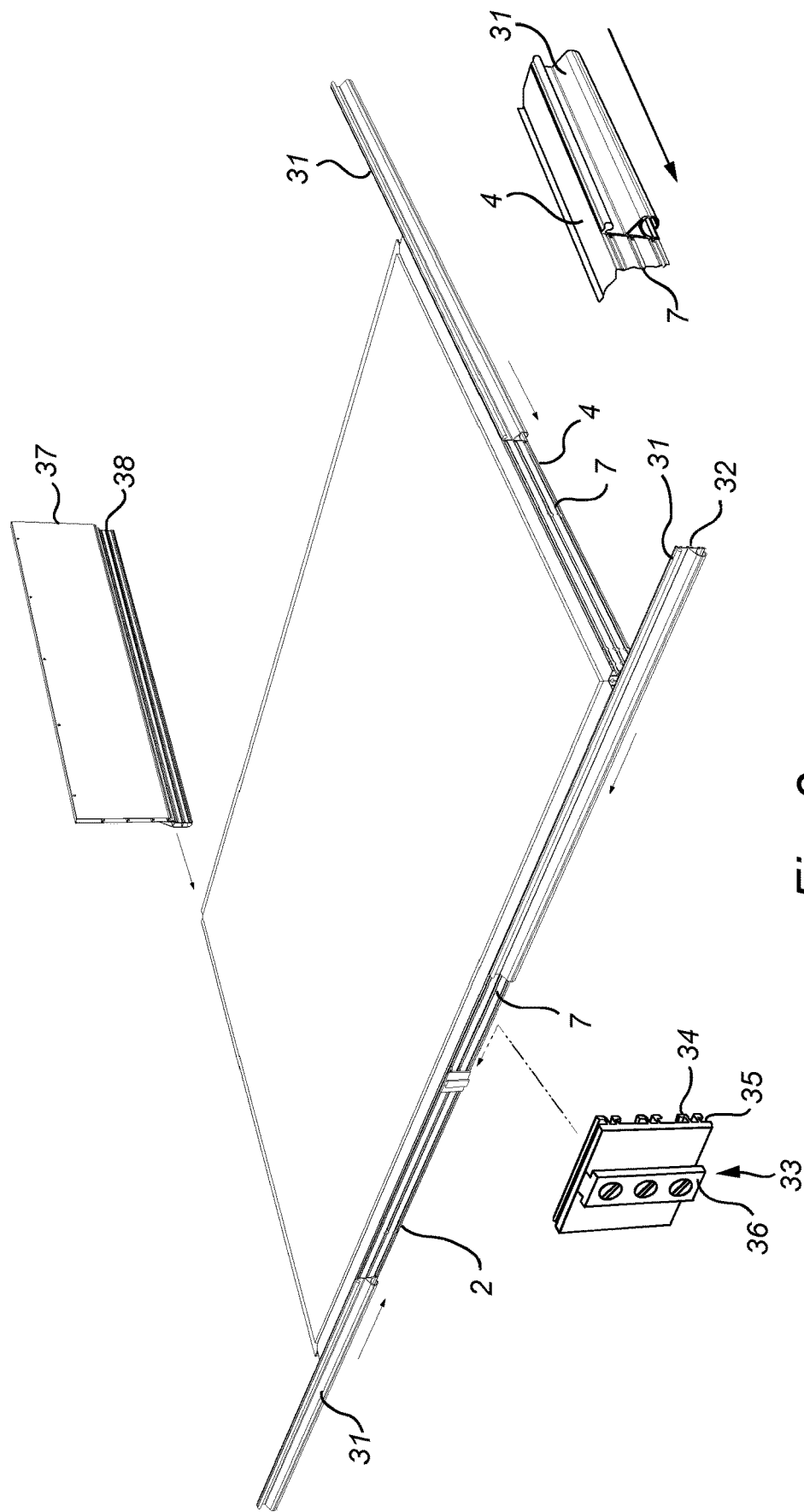
FIG. 3a-g shows mounting of dropsides to the loading platform.
Figure 4:
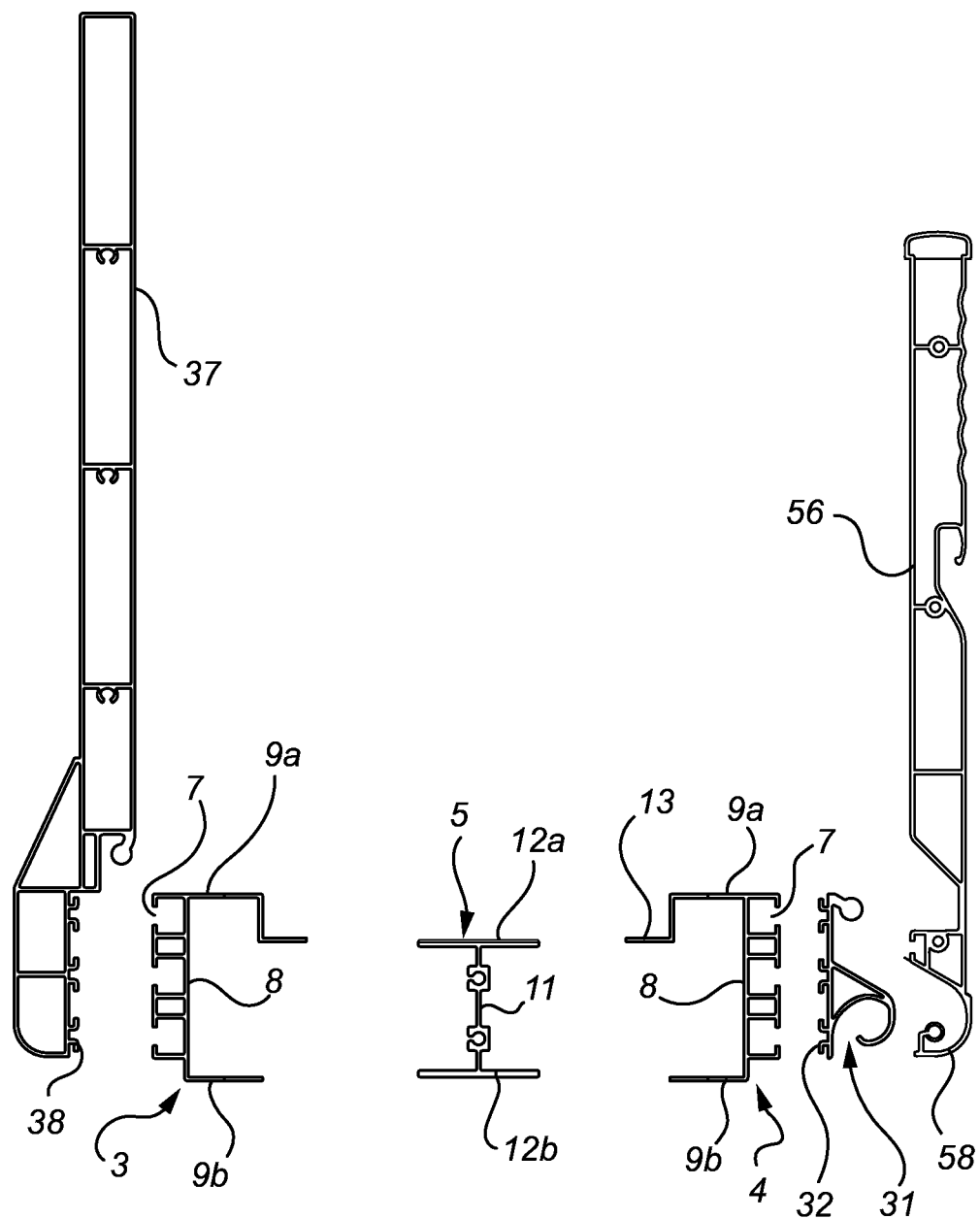
FIG. 4 shows an exploded view of cross-sections of various profiles in FIG. 3c.

As shown in FIG. 3a, hinge elements 31 are attached to the rear member 4 and side members 2. The hinge elements 31 have at least two parallel, elongated protrusions 32 adapted to be inserted by sliding motion into the grooves 7, each protrusion 32 in a separate groove 7. When inserted, the protrusions 32 engage the grooves 7, so as to allow sliding the hinge profiles along the grooves but preventing any other motion. In the illustrated example, the hinge elements 31 are extruded profiles, e.g. of aluminum, with a cross-section as shown in FIG. 4. The protrusions 32 therefore extend along the entire length of each extruded hinge element 31, although this is not a requirement.

Figure 3B:
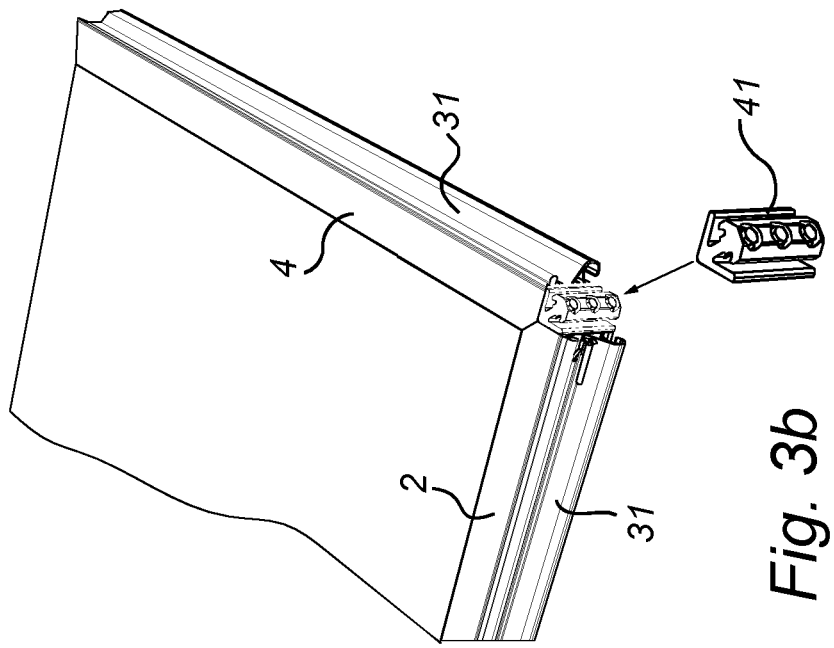
Figure 3C:
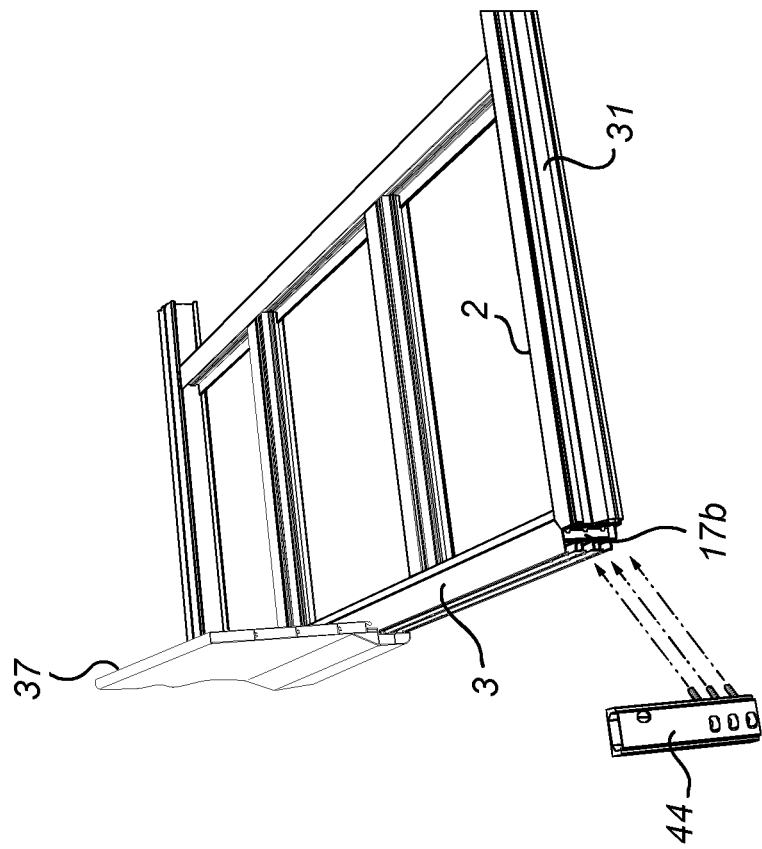
Figure 3D:
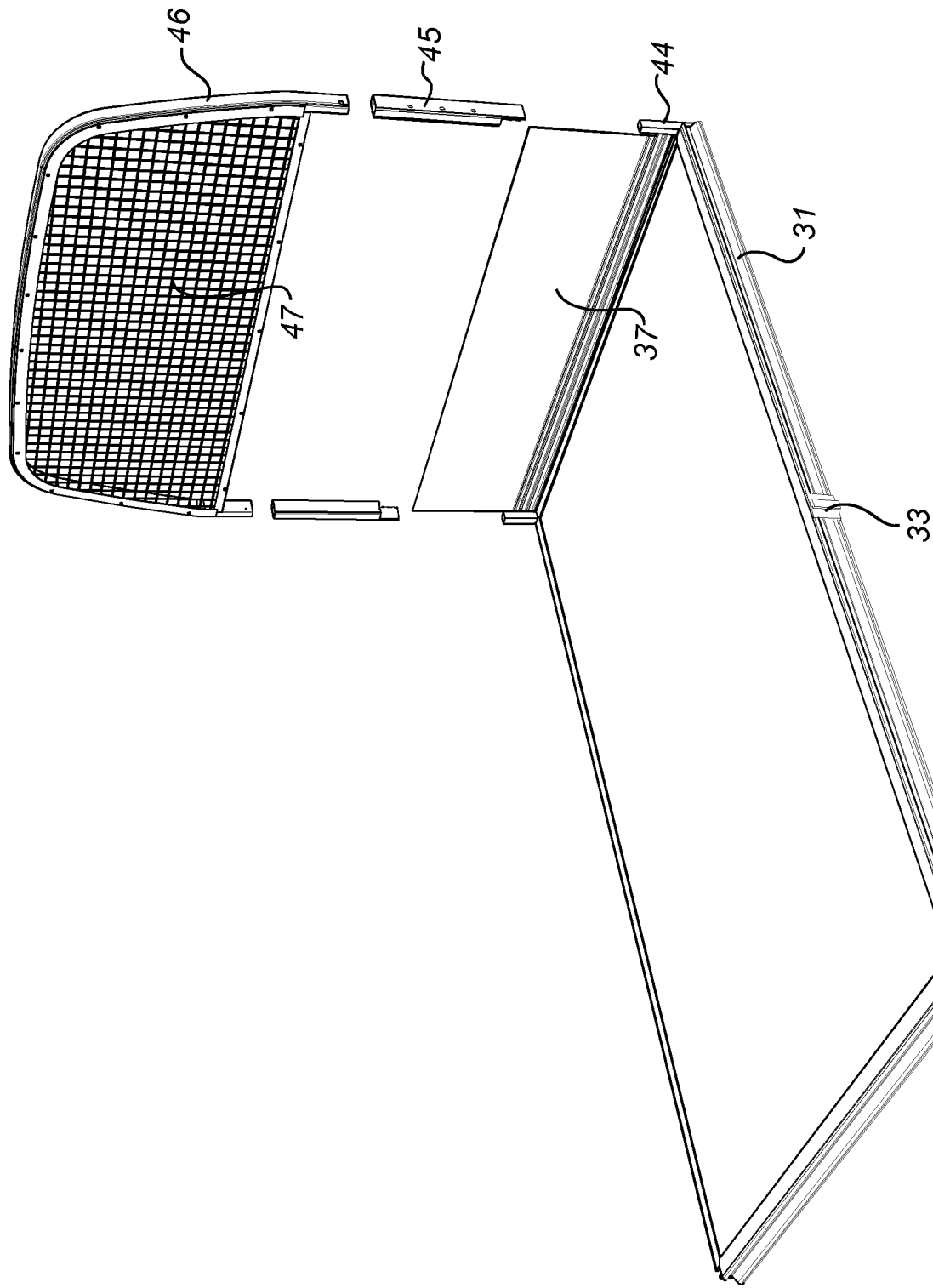
Figure 3F:
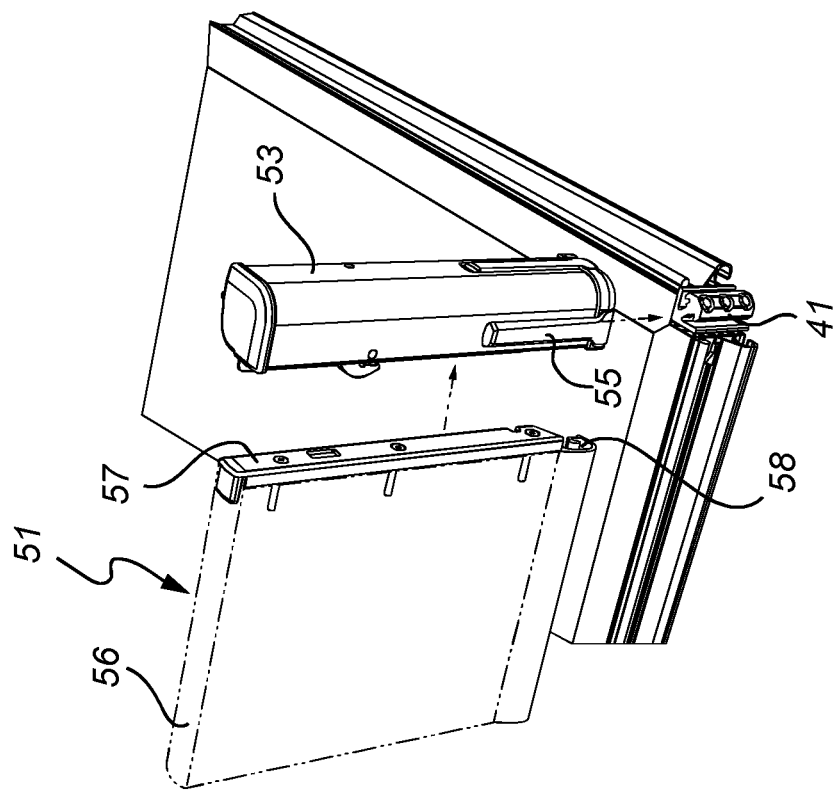
Figure 3E:
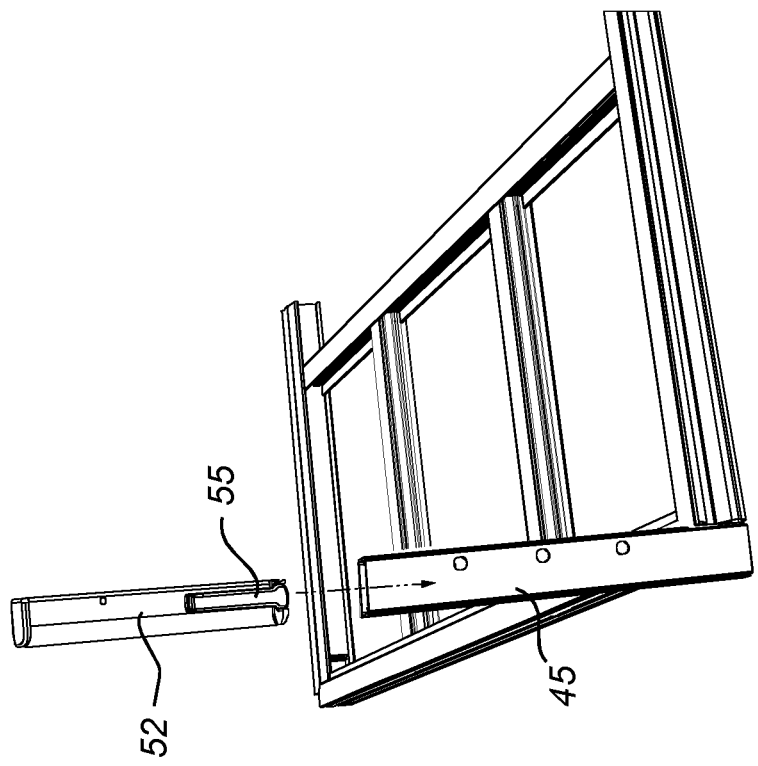
Figure 3G:
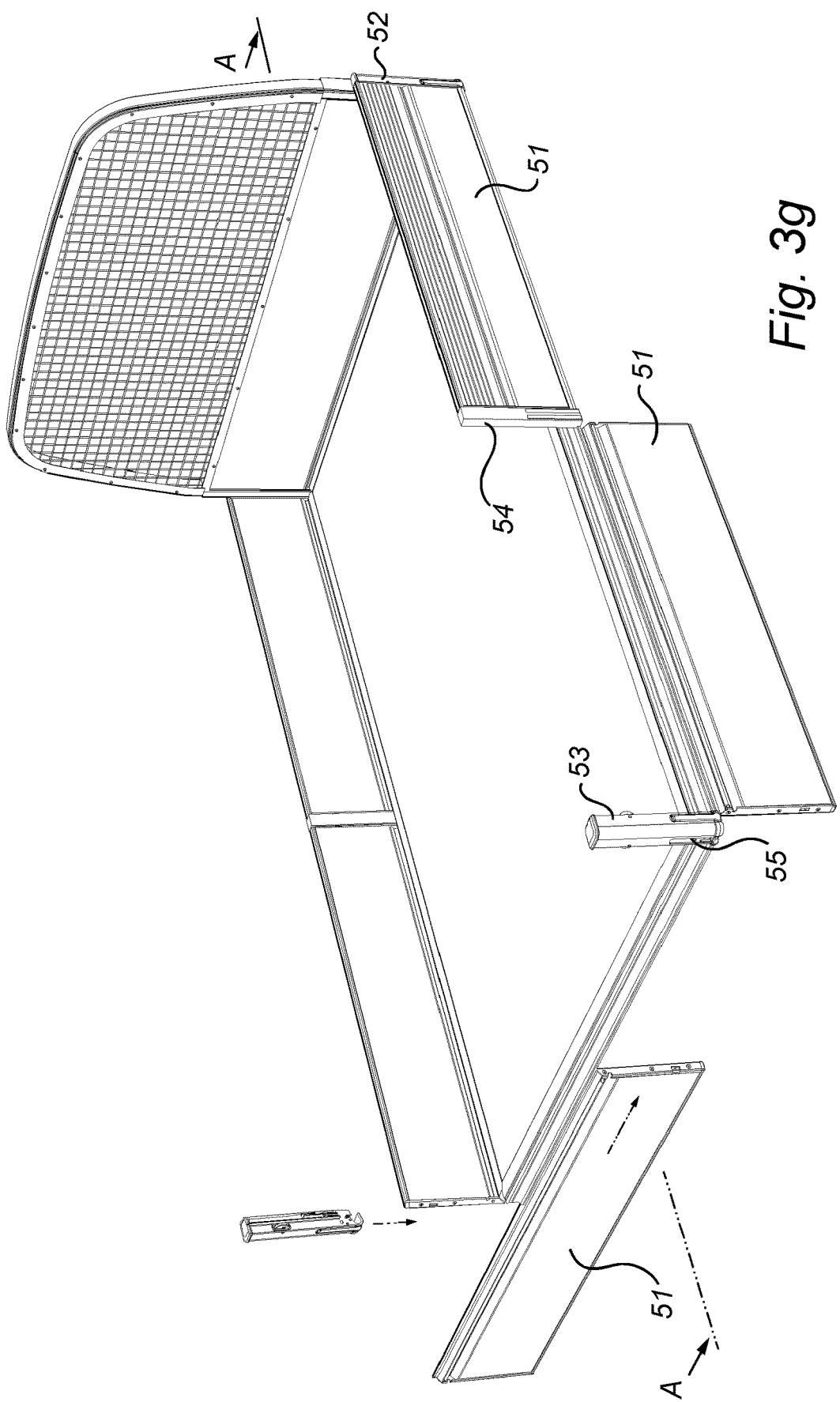

In the present case, the length of each hinge element corresponds to the length of a dropside (see FIG. 3g). Further, if more than one dropside is required along the loading platform, two adjacent hinge elements are separated by a side pillar fitting 33. The pillar fitting 33 is provided with similar protrusions 34 as the hinge elements, and is slid into place before the next hinge element 31 is slid into the grooves. In the illustrated example, the pillar fitting 33 comprises a first extruded profile 35, with the protrusions 34, and a second extruded profile 36, attached (e.g. by screws) to the extruded profile 35. The extruded profile 36 is configured to allow easy mounting of a side pillar (see FIG. 3c).

Still with reference to FIG. 3a, a front wall mounting profile 37, provided with similar protrusions 38 as the hinge elements 31, is attached by sliding into the grooves 7 of the front member 3.

With reference to FIG. 3b, rear corner pillar fittings 41 are secured to the rear corner brackets 17a, e.g. by screws received by threaded holes in the brackets 17a. Further, with reference to FIG. 3c, front corner fittings 44 are secured to the front corner brackets 17b, e.g. by screws received by threaded holes in the brackets 17b. The rear corner pillar fittings 41 and front corner fittings 44 serve to lock the slidable front wall mounting profile 37, the hinge elements 31 and the side pillar fittings 33, so as to prevent them from sliding along and out of the grooves 7. It is noted that the space between two corner fittings 41, 44 is here completely filled by a series of mounting elements, here hinge elements 31, so that a series of hinge elements between two corner fittings are securely held in place, and cannot slide along the grooves. In particular, in the illustrated case the position of the pillar fitting 33 is defined by the length of the hinge elements 31.

Further, in the illustrated example in FIG. 3d, vertical hollow profiles 45 can be mounted on the front corner fittings 44, on either side of the profile 37. A bow 46 and a protective mesh 47 can be mounted on the vertical profiles 44 and secured by suitable means, e.g. rivets.

With reference to FIG. 3e-g, the loading platform is now equipped with a system of dropsides 51 and pillars 52, 53, 54. The pillars 52, 53, 54 serve to support the dropsides 51 in their upright position, and include front pillars 52, rear pillars 53, and in the illustrated case also a side pillar 54 (between two dropsides 51). In the illustrated example, the dropsides and pillars are of the Armaton® type, where the dropsides 51 are releasably connectable to the pillars by means of levers 55 integrated into the pillars. This is not a prerequisite of the present invention, and it is possible to mount other types of dropsides and pillars, including pillars mounted in a more permanent manner.

As illustrated in FIG. 3e, the front pillars 52 are here slidably mounted to outside of the vertical profile 45 which in turn is mounted on the front corner fittings 44 (see FIG. 3d). As illustrated in FIG. 3f, the rear pillars 53 are slidably mounted to the rear corner pillar fittings 41. In the case of side pillar fittings 33, side pillars 54 are slidably mounted to these fittings 33, in a similar fashion. The pillars 52, 53, 54 are here configured to be easily detachable from the fittings 33, 41 and profile 47, respectively. In other embodiments, they may be more permanently attached.

As shown in FIG. 3g, the dropsides 51 are hingedly arranged to the hinge elements 31. In the present example, each dropside 51 is composed of an extruded profile 56, e.g. an aluminum profile, with a cross section as illustrated in FIG. 4. The profile 56 is provided with end pieces 57, which may be attached with Taptite® screws.

The dropsides 51 (here the profile 56) here has a longitudinal edge 58 with a cross section adapted to hingedly engage the hinge element 31 (see FIG. 4) so that the dropside is rotatable around the edge 58. The dropside 51 is thus rotatable around an axis parallel to the side of the frame 1. The dropside 51 has a closed position, in which the dropside is standing upright from the loading platform and can be connected between two pillars 52 and 53 or 53 and 54. The dropside 51 further has an open position, in which the dropside is hanging from the loading platform. The cross-section of the hinge elements 31 and the dropsides 51 are here configured such that the dropside may be connected to the hinge element 31 when in its open, hanging position. With another design, the dropside 51 may need to be slid into the hinge element 31, in which case it may need to be mounted before all pillars 52, 53, 54 have been mounted.

In another embodiment, illustrated in FIG. 5a-g and FIG. 6a-b, the loading platform in FIG. 1 may be provided with walls to form a closed cargo compartment.

Figure 5A:
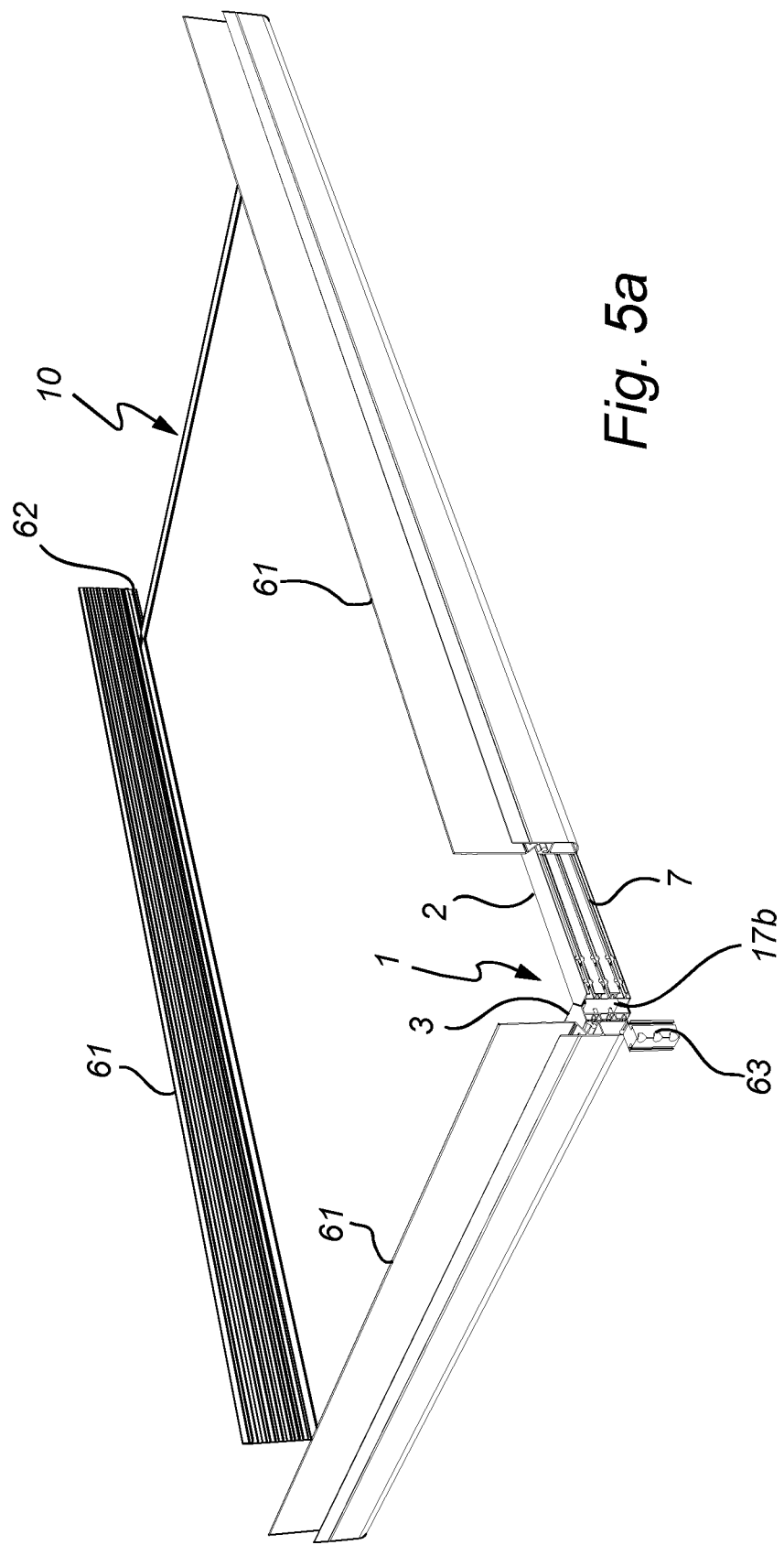

The loading platform 10 in FIG. 5a is substantially identical to the loading platform 10 in FIG. 3a, and most importantly it includes a frame 1 having parallel grooves 7 extending along its outwardly facing sides.

As shown in FIG. 5a, wall mounting elements 61 are attached to the front member 3 and side members 2. The wall mounting elements 61 have at least two parallel, elongated protrusions 62 adapted to be inserted by sliding motion into the grooves 7, each protrusion 62 in a separate groove 7. When inserted, the protrusions 62 engage the grooves 7, so as to allow sliding the wall mounting elements 61 along the grooves but preventing any other motion. In the illustrated example, the mounting elements 61 are extruded profiles, e.g. of aluminum, with a cross-section as shown in FIG. 6a.

The protrusions 62 therefore extend along the entire length of each extruded wall mounting element 61, although this is not a requirement.

Front corner fitting 63 are mounted to each front corner bracket 17b, e.g. by screws received by threaded holes in the brackets 17b. The front corner fittings 63 serve to lock the slidable wall mounting elements 61, so as to prevent them from sliding along and out of the grooves 7.

Turning to FIG. 5b, a rear side profile 64 is mounted to the rear frame element 4, again by sliding its protrusions (not shown) into the grooves 7. Rear corner fitting 65 are mounted to each rear corner bracket 17a, e.g. by screws received by threaded holes in the brackets 17b. The rear corner fittings 63 serve to lock the slidable wall mounting elements 61 and rear profile 64, so as to prevent them from sliding along and out of the grooves 7.

It is noted that also in this embodiment the space between two corner fittings 63, 65 is completely filled by a series of mounting elements, here wall mounting elements 61, so that a series of wall mounting elements between two corner fittings are securely held in place, and cannot slide along the grooves.

Figure 5C:
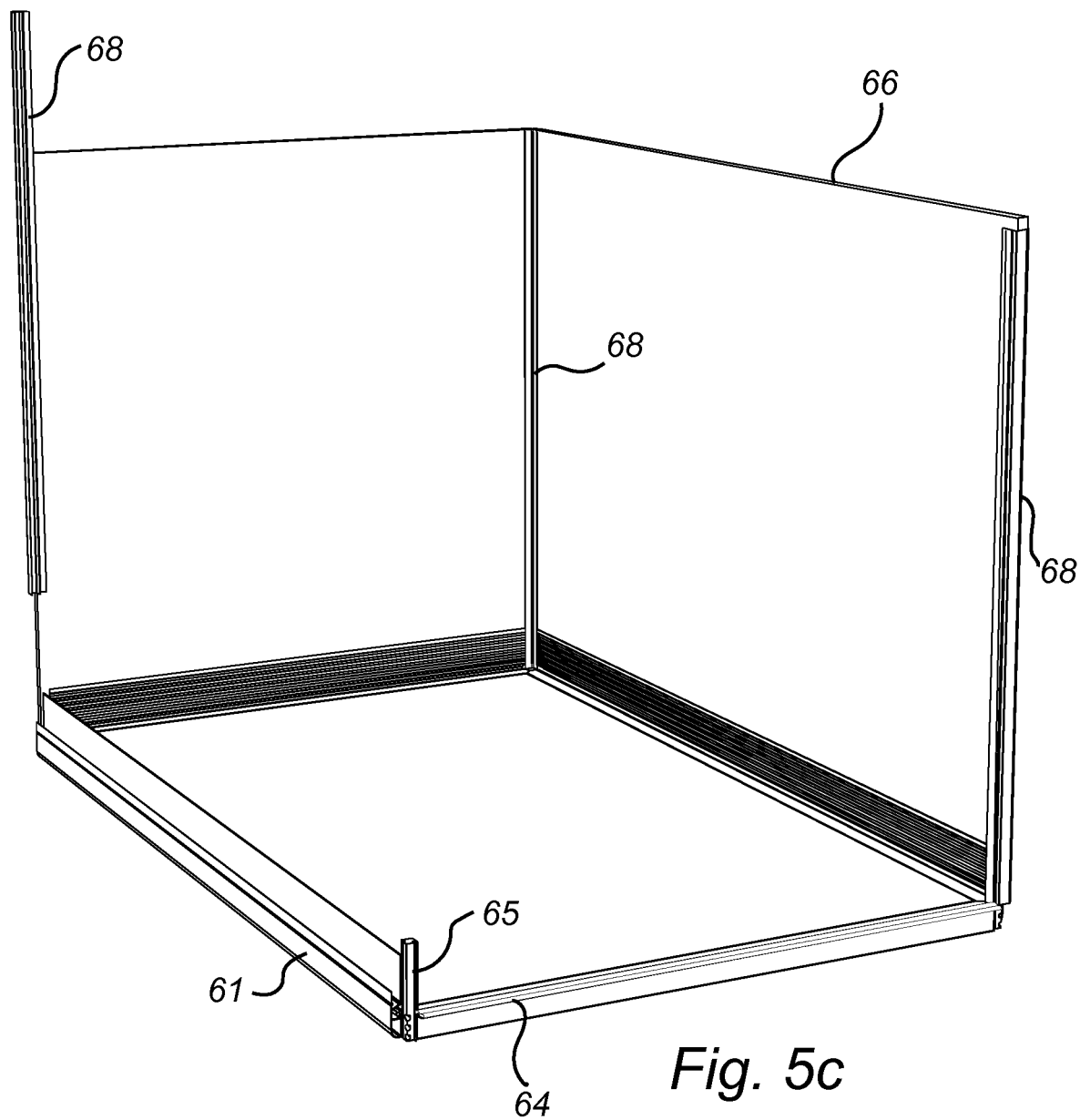
Figure 5D:
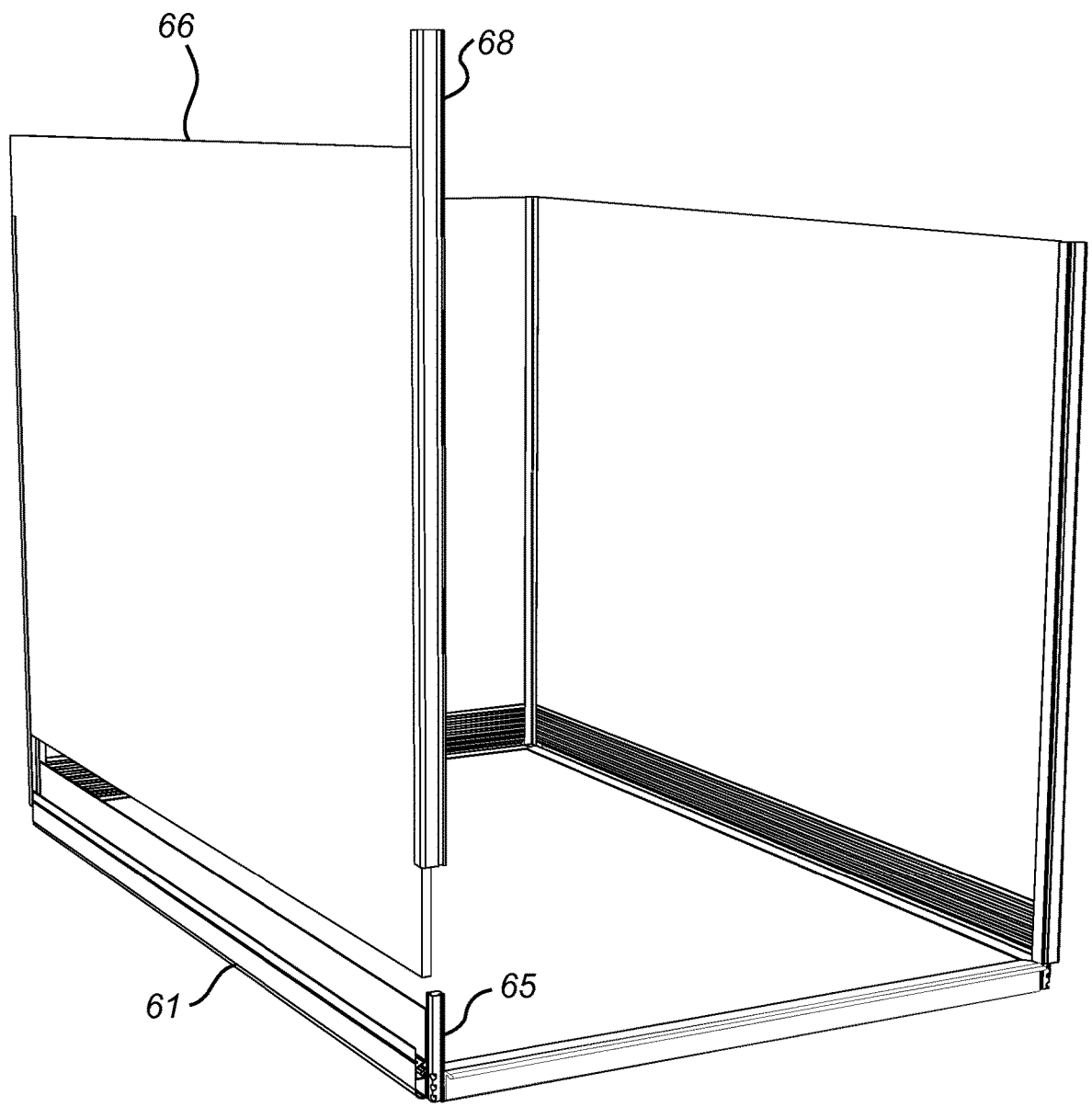

With reference to FIGS. 5c and 5d, front and side wall panels 66 can now be mounted in the wall mounting elements 61, by insertion into upwardly facing openings 67 in the elements (see also FIG. 6a). In each corner, a vertical corner profile 68 is mounted. The vertical corner profiles 68 can have a cross section as indicated in FIG. 6b, with sideways facing openings 69 for receiving the edge of the wall panels.

Figure 5E:
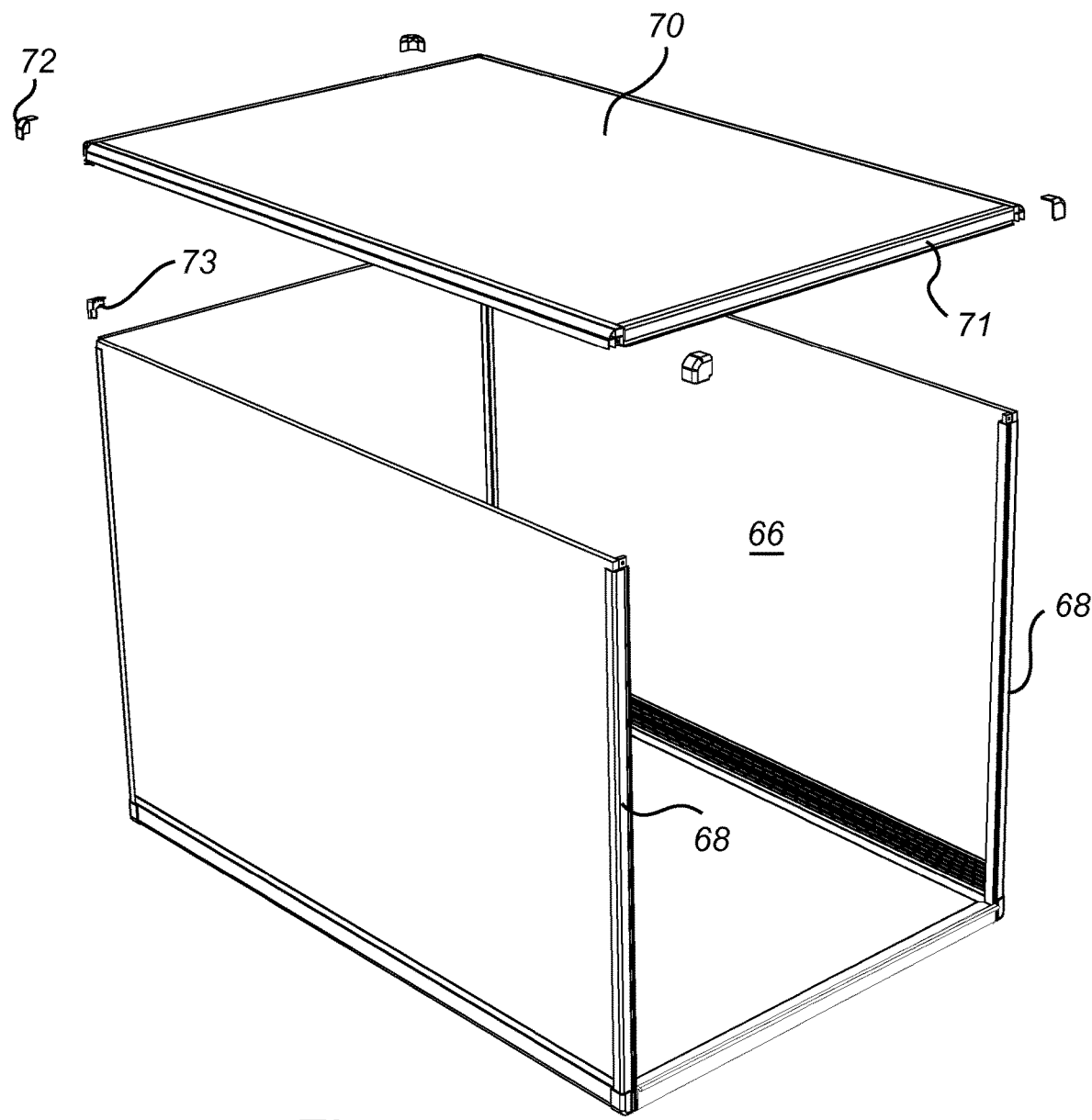

In FIG. 5e, a roof panel 70 is mounted onto the vertical wall panels 66, thereby forming a closed cargo compartment. It is noted that the "closed" compartment is here open towards the rear of the loading platform, but this opening may be closed by suitable door arrangement (not shown). The roof panel 70 is mounted by means of horizontal roof profiles 71, which are here substantially identical to the vertical corner profiles 68. In order to increase stability, corners fittings 72 may be mounted, e.g. snap fitted, to each corner where vertical and horizontal profiles 68, 71 meet. Further, corner brackets 73 may be mounted from the inside, and be attached to the horizontal and vertical profiles 68, 71, and optionally to the corner fittings 72.

Figure 7:
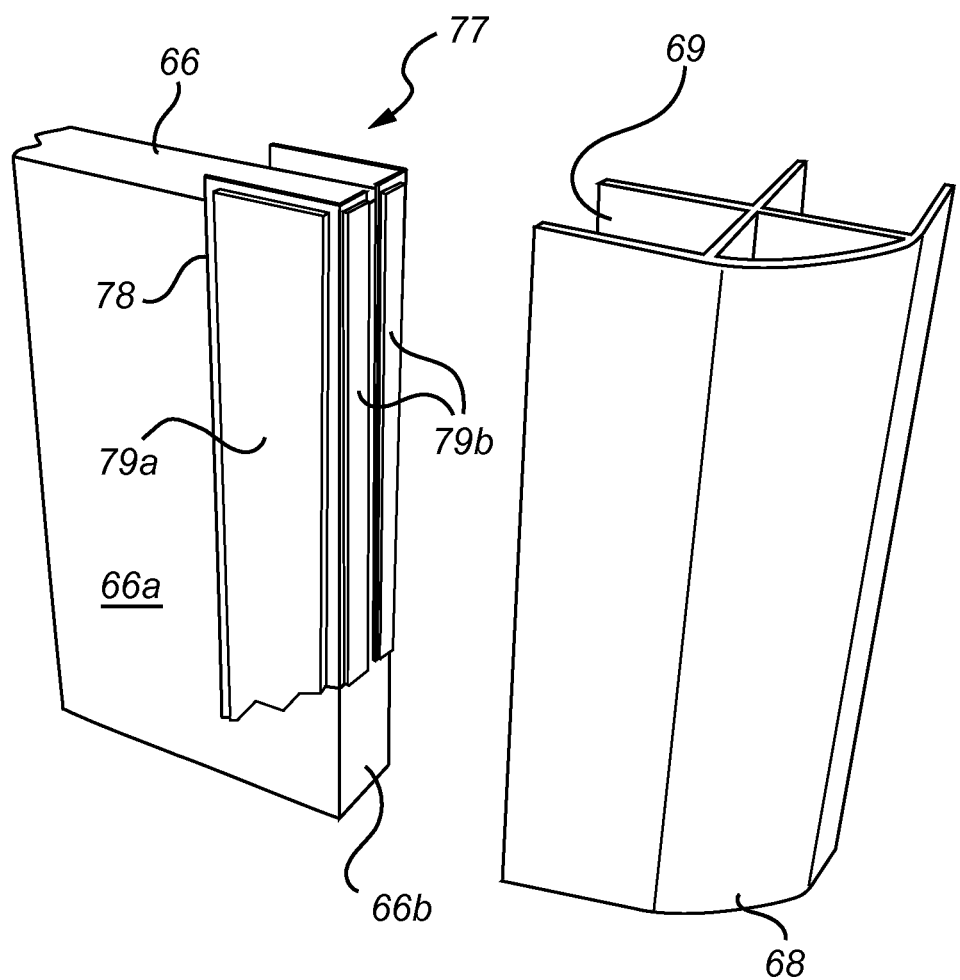
FIG. 7 shows attachment of a wall panel to a profile.

In order to facilitate mounting of the wall panels 66 in the holding elements 61 and profiles 68, 71, self-adhesive strips 77 may be applied to the edges of the wall panels 66, as illustrated in FIG. 7. Each strip 77 includes a substrate 78 which is attached (e.g. adhered) to the wall panel 66, and one or several self-adhesive patches 79a, 79b. In the illustrated case, each strip 77 has two self-adhesive patches 79a, 79b, separated by some form of folding indication (e.g. a groove). Each strip 77 is folded between the two patches, and attached to the panel such that one patch 79a is located on a flat face 66a of the panel 66, and the other patch 79b is located on the edge 66b of the panel 66. By applying two strips in this manner, the panel is provided with self-adhesive patches on three sides. The separation between the strips on the edge 66b of the panel will depend on the thickness of the wall panel 66.

When attaching the wall panel 66 to the profile 68, any protective cover of the self-adhesive patches 79a, 79b is first removed, and the panel 66 is pushed into the opening 69 of the profile 68. The pressure applied by the profile will serve to cure the adhesive in the patches 79a, 79b, which will serve to hold and seal the wall panel 66. In order to further improve the attachment, the inside of the opening 69 may be provided with ribs or grooves (not shown).

Figure 8:
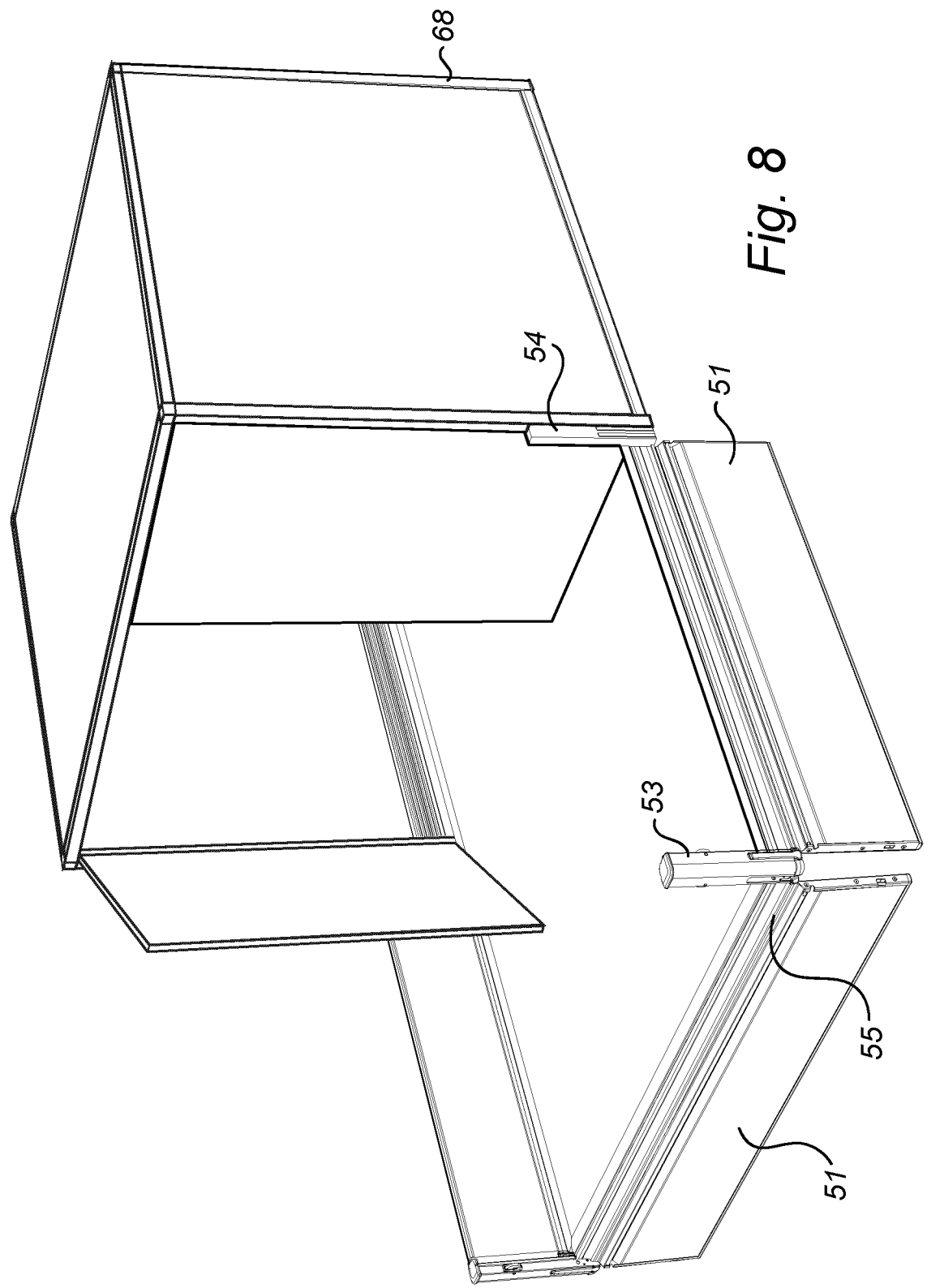
FIG. 8 shows a loading platform provided with dropsides as shown in FIGS. 3a-g and a cargo compartment as shown in FIGS. 5a-f.

As shown in FIG. 8, it is also possible to combine the cargo compartment in FIG. 5 with the dropsides in FIG. 3, to create a loading platform having a front cargo compartment and a rear open loading space.

The person skilled in the art realizes that the present invention by no means is limited to the preferred embodiments described above. On the contrary, many modifications and variations are possible within the scope of the appended claims. For example, the exact design of the profile cross sections may deviate from what is shown herein, without departing from the inventive concept. Also, the modular loading platform according to the invention may be used for mounting may other structures, in addition to the dropsides and cargo compartment discussed herein.

The invention claimed is:

1. A modular loading platform for a vehicle, said platform comprising:
   a substantially rectangular frame composed of a plurality of interconnected extruded frame members, said frame members including two side members, and a front member and a rear member connected transversally between the ends of the side members;
   wherein said rear member and said side members are each provided with at least two parallel grooves extending along the members and facing away from the frame;
   characterized by:
   a set of mounting elements, each mounting element having parallel protrusions which have been inserted by sliding motion into engagement with said parallel grooves in one of said rear member and said side members, such that a first one of said parallel protrusions engages a first parallel groove and a second one of said parallel protrusions engages a second parallel groove;
   said mounting elements forming a structure on which additional parts of the loading platform may be mounted.

2. The loading platform according to claim 1, wherein the mounting element(s) inserted into the parallel grooves of one of said rear member and said side members fill substantially an entire length of said parallel grooves.

3. The loading platform according to claim 2, further comprising corner fittings attached to corners of said frame, said corner fittings configured to prevent sliding motion of mounting elements inserted in parallel grooves of said rear member and/or said side members.

4. The loading platform according to claim 1, wherein also said front member is provided with two or more parallel grooves extending along the member and facing away from the frame,
   the set of mounting elements further comprising at least one mounting element having parallel protrusions which has been inserted by sliding motion into engagement with said parallel grooves in said front member.

5. The loading platform according to claim 1, wherein said frame members have a substantially open rectangular cross section, with a web extending between two flanges, and wherein said parallel grooves are formed on said web facing away from said open rectangular cross section.

6. The loading platform according to claim 1, wherein said frame elements further comprise one or several support members, connected to the side members and/or the front member and/or the rear member, to increase the structural strength of said frame.

7. The loading platform according to claim 5, wherein said support members are I-profiles with a central web connecting upper and lower flanges.

8. The loading platform according to claim 1, further comprising a loading surface arranged on said frame and resting against said frame members.

9. The loading platform according to claim 1, wherein said mounting elements include hinge elements, and wherein said additional parts include platform dropsides hingedly attached to said hinge elements, so as to be rotatable around an axis parallel to a side of the frame.

10. The loading platform according to claim 8, wherein each hinge element is an elongated extruded member with an open cross section having a length corresponding to a length of one of said dropsides, and wherein a longitudinal side of said one of said dropsides has an open cross section adapted to be engaged by the hinge element along its length.

11. The loading platform according to claim 8, wherein said mounting elements further include side pillar fittings, and wherein said additional parts include side pillars attached to said pillar fittings and extending in a plane normal to a plane of the frame, at least some of said dropsides being releasably connectable to said side pillars.

12. The loading platform according to claim 10, wherein each side of said frame is provided with two or more hinge elements and a side pillar fitting between adjacent hinge elements.

13. The loading platform according to claim 1, wherein said mounting elements include wall mounting elements, and said additional parts include at least one wall panel fixedly fitted in said wall mounting elements.

14. The loading platform according to claim 12, wherein said at least one wall panel include a vertical front wall panel and two vertical side wall panels, and wherein the loading platform further comprises a roof panel mounted to the vertical wall panels (66) so as to form a closed cargo compartment.

15. A method for assembling a loading platform, comprising:
providing a set of extruded members including two side members, a front member and a rear member, wherein said rear member and said side members are each provided with at least two parallel grooves extending along the members;
mounting the front member and the rear member transversally between ends of the side members to form a substantially rectangular frame, with the grooves facing out from the frame;
characterized by:
providing a set of mounting elements, each mounting element having parallel protrusions configured to be inserted into engagement with said parallel grooves; and
sliding each mounting element into rotationally fixed engagement with said parallel grooves in one of said rear member and said side members, such that a first one of said parallel protrusions engages a first parallel groove and a second one of said parallel protrusions engages a second parallel groove, said mounting elements forming a structure on which additional parts of the loading platform may be mounted.

16. The method according to claim 15, further comprising attaching corner fittings to corners of said frame, said corner fittings configured to prevent sliding motion of mounting elements inserted in parallel grooves of said rear member and/or said side members.

17. The method according to claim 15, wherein also said front member is provided with two or more parallel grooves extending along the member and facing away from the frame, the method further comprising:
sliding at least one mounting elements into engagement with said parallel grooves in said front member.

18. The method according to claim 15, further comprising:
providing one or several support members; and
connecting each support members to the side members and/or the front member and/or the rear member, to increase the structural strength of said frame.

* * * * *